B. JACKSON.
Feeder for Thrashing-Machines.

No. 163,076. Patented May 11, 1875.

Witnesses
Geo. H. Strong.
Jno. L. Boone.

Inventor
Byron Jackson
by Dewey & Co
Attys.

THE GRAPHIC CO. PHOTO-LITH. 39 & 41 PARK PLACE, N.Y.

UNITED STATES PATENT OFFICE.

BYRON JACKSON, OF WOODLAND, CALIFORNIA.

IMPROVEMENT IN FEEDERS FOR THRASHING-MACHINES.

Specification forming part of Letters Patent No. 163,076, dated May 11, 1875; application filed March 24, 1875.

*To all whom it may concern:*

Be it known that I, BYRON JACKSON, of Woodland, Yolo county, State of California, have invented an Improvement in Feeders for Thrashing-Machines; and I do hereby declare the following description and accompanying drawings are sufficient to enable any person skilled in the art or science to which it most nearly appertains to make and use my said invention or improvement without further invention or experiment.

My invention relates to certain improvements in feeders for delivering unthrashed straw to the cylinder of a thrashing-machine, and my improvement is based more especially upon the patent granted to W. J. Sloan September 3, 1867, in which a moving belt or carrier conveys the grain to the cylinder, and a revolving shaft or drum armed with teeth is intended to regulate the delivery of the straw. I have found, however, that when a large bunch of straw strikes the picker it will remain until forced onward by other straw from behind, when it will pass through without being separated, and when the machine is operating where there are prevalent high winds, as in some parts of California, the straw will be blown upon the picker, around which it becomes twisted, so that the machine must be stopped to disentangle it. In order to obviate this diffiulty, I construct my feeder with a short inclined belt, which stands above the discharge end of the feeding-belt in place of the picker, and assist in guiding and directing the straw to the cylinder.

Figure 1:
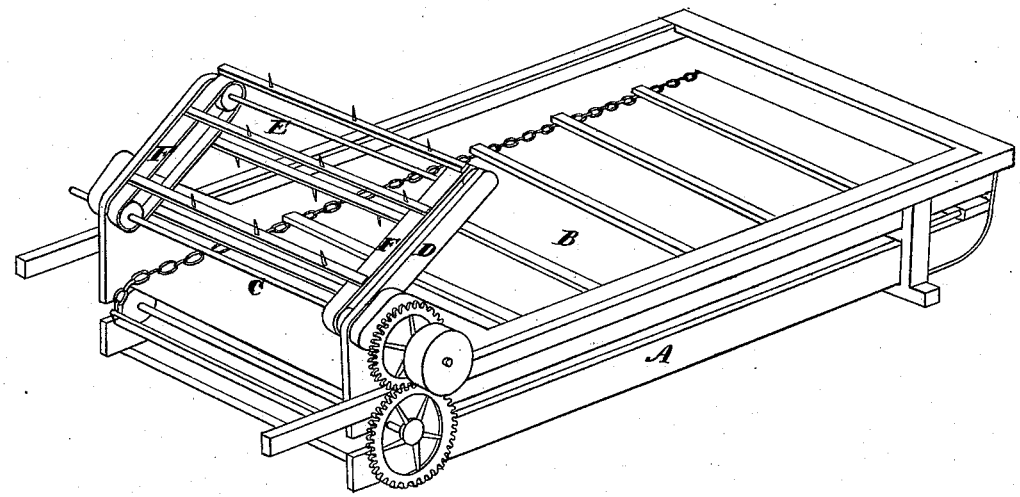
Figure 2:
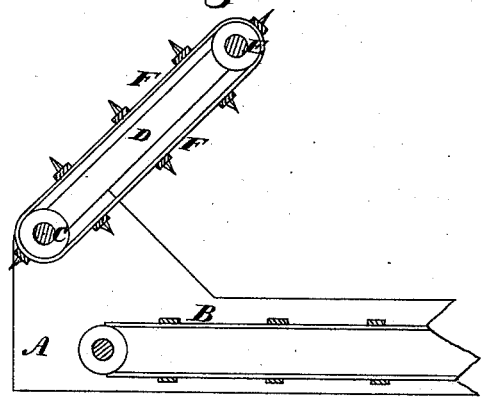

Referring to the accompanying drawing for a more complete explanation of my invention, Figure 1 is a perspective view of my feeder and attachment. Fig. 2 is a sectional elevation.

A is the frame or box within which the carrying-belt B moves, being driven by suitable mechanism. The front end of the frame is so constructed as to support a shaft, C, which extends across it. A supplemental frame, D, extends from this shaft upward and backward at an angle of about forty-five degrees, and a shaft, E, extends across the upper end of this frame. Upon the outer ends of the shaft C and E are pulleys, over which the edges of a supplemental carrying-belt, F, pass, and this belt is driven so that its lower surface moves toward the discharge. As the frame D has some freedom of motion about the shaft C, it will be self-adjusting, and its outer end can rise or fall, as more or less straw is brought to it. If there is a high wind blowing directly toward the cylinder, this frame D, with its belt, may be set up to a greater angle, and thus prevent the straw from being blown over. By making this belt of considerable length, I avoid all the difficulty of having straw wind upon it, as happens in the use of a cylindrical picker.

Having thus described my invention, what I claim as new, and desire to secure by Letters Patent, is—

The toothed endless feeding-belt F, mounted above the carrier-belt B upon frame E, journaled at its lower end upon shaft C, and having its upper end free to vibrate according to the feed, substantially as and for the purpose described.

In witness whereof I hereunto set my hand and seal.

BYRON JACKSON. [L. S.]

Witnesses:
 JNO. L. BOONE,
 HENRY SCHRIBER,
 JOHN CRONIN.